May 18, 1926. 1,584,785
C. D. McCOLLOUGH
RESILIENT WHEEL TIRE
Filed Sept. 4, 1923
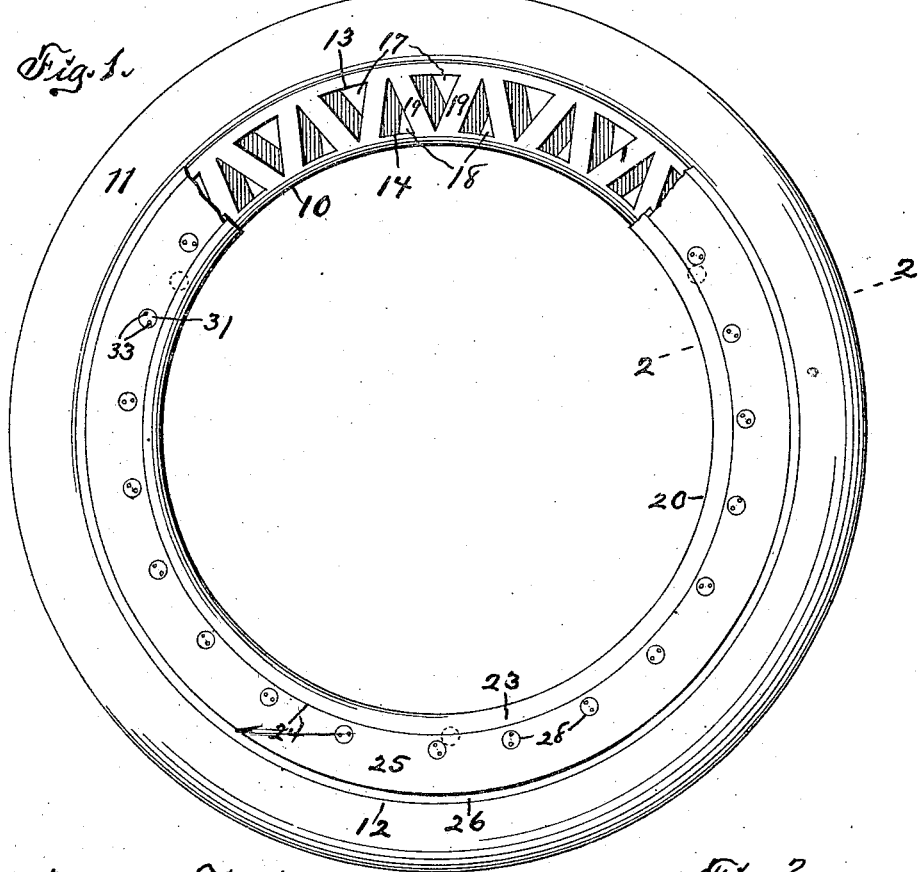
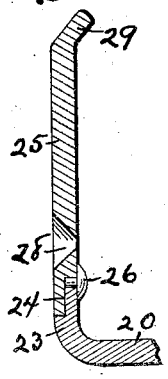
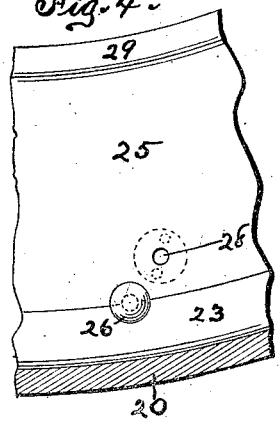
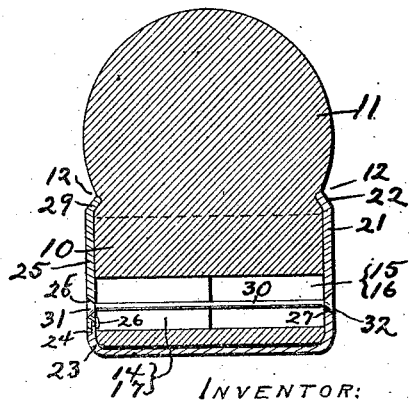
INVENTOR:
C. D. McCOLLOUGH.
By Earl M. Sinclair
Atty.

Patented May 18, 1926.

1,584,785

UNITED STATES PATENT OFFICE.

CHARLES D. McCOLLOUGH, OF DES MOINES, IOWA, ASSIGNOR, BY DIRECT AND MESNE ASSIGNMENTS, TO HIMSELF, E. F. LEWIS, AND GEORGE W. LEWIS, BOTH OF CAMBRIDGE, IOWA.

RESILIENT WHEEL TIRE.

Application filed September 4, 1923. Serial No. 660,795.

An object of this invention is to provide an improved resilient and elastic tire for vehicle wheels.

A further object of this invention is to provide an improved molded resilient and elastic tire for vehicle wheels, which is formed with a substantially uniform displacement of its material content throughout its circumference, whereby practically uniform resilience and compressibility are produced circumferentially of the tire.

A further object of this invention is to provide an improved molded resilient and elastic tire for vehicle wheels, which tire is formed with apertures on its lateral sides to increase its resilience, said apertures communicating circumferentially to permit circumferential displacement of air therein during travel of the tire.

A further object of this invention is to provide an improved construction for a rim adapted to contain and be carried by a tire having apertures in its lateral sides.

My invention consists in the construction, arrangement and combination of elements hereinafter set forth, pointed out in the claims and illustrated by the accompanying drawing, in which—

Figure 1 is a side elevation of my improved tire and rim combined, a portion of the rim being broken away to reveal interior construction. Figure 2 is a cross-section, on an enlarged scale, on the indicated line 2—2 of Figure 1. Figure 3 is a cross-section, on a further enlarged scale, of a portion of the rim and Figure 4 is a longitudinal section, or inside elevation, of the parts shown in Figure 3.

In the construction of the devices as shown the numeral 10 designates the base or radially inner portion of a tire and 11 designates the tread or radially outer portion of the same tire, which preferably is molded, in annular form and of homogeneous character, from a single material such as rubber, or other suitable material such as synthetic or salvaged rubber or a combination of any such single material with reinforcing, bonding or strengthening material or materials, having greater or less inherent resilient properties. The homogeneous or composite tires, having the base 10 and tread 11, may be made with any suitable dimensions adapting them for use on wheels or wheel rims.

The base 10 preferably is substantially rectangular in cross-section and an annular groove 12, of slight depth, may provide demarkation between said base and the tread portion 11 on each or either side of the tire. The base 10 is formed with a series or annular row of apertures or cavities 13, 14 in one of its lateral sides and, also, is formed with a similar row of apertures or cavities 15, 16 in the other of its lateral sides. The apertures 13 and 15 are of substantially uniform size and dimension and preferably each is, in cross-section, the shape of an equilateral or other isosceles triangle having its base arranged toward and falling in an arc concentric with and of less radius than the outer circumference of the annulus of said base, and one of its apices directed toward and falling within an arc concentric with and of less radius than the center of said annulus, the latter arc preferably being adjacent to the innermost annular surface of the tire. Each of the apertures or cavities 13 and 15 extends from a lateral surface of the base 10 to the median line thereof, wholly falls within the annular space between the two intermediate arcs above noted and the apertures 13 are staggered relative to the apertures 15 and overlap them so as to produce triangular holes 17 on the median line of the tire, which holes each have an area of substantially one-fourth the cross-section of one of said apertures or cavities. The apertures or cavities 14 and 16 are of substantially uniform size and dimension and preferably each is, in cross-section, the shape of an isosceles triangle having a shorter base than the cavities 13 and 15. The cavities 14 and 16 are arranged between and inverted relative to the cavities 13 and 15 in their annular rows, being arranged so that the base of each cavity 14 or 16 falls in the arc occupied by the innermost apices of the alternating cavities and the outermost apices of said cavities 14 and 16 fall in the arc occupied by the bases of said alternating cavities. Each of the apertures or cavities 14 and 16 extends from a lateral surface of the base 10 substantially to but not beyond the median line thereof, wholly falls within the space between the two intermediate arcs above noted and alternate with the cavities 13 and 14 respectively; and the cavities 14 are staggered relative to the cavities 16 and overlap them so as to produce triangular holes 18 on the median line of the tire, which holes each have an area of substantially one-fourth the cross-section of one of said cavities 14 or 16. Thus two sets of spaced apertures are formed which extend entirely through and transversely of the base 10, as clearly shown in Figure 1, each of said apertures 17, 18 being the shape of an isosceles triangle. The formation of the various apertures increase the compressibility of the base and the resilience of the tire. It is apparent that the size and spacing of the apertures may be varied in accordance with the degree of compressibility and resilience desired to be obtained, and the weights to be borne; but the apertures on one side should always be staggered relative to and overlap the apertures on the other side to provide communication between adjacent and successive apertures. When the apertures are arranged close together as shown and described, it is apparent that the displacement of rubber content of the base is substantially uniform at all points throughout the circumference thereof, thus assuring substantially uniform resilience and obviating objectionable bumping effect in use of the tire. It is also apparent that by reason of the overlapping of the apertures and their staggered relation, a sinuous continuous channel or open space is provided circumferentially of the base, when said base is inclosed by the rim as hereinafter described. Thus displacement of air in the aperture is permitted circumferentially of the base as it travels under pressure of a load, which further increases the resilience and uniform compressibility of the whole tire. The tread portion 11 of the tire also is compressible and elastic to a degree and takes the wear and contact of the tire with the road surface. It will be observed that the apertures or cavities of a given row are separated by ribs 19 which extend on inclined lines across the space between the intermediate arcs above noted, said lines being tangential to an arc intermediate of the inner annular surface of the tire and the center of said tire, adjacent ribs being on converging planes. Thus the longitudinal plane of any rib is at no time perpendicular to the roadway or tread surface on which the tire travels and the load is applied at an angle to said plane, thus increasing the flexibility of the tire and avoiding injurious buckling of the ribs. An annular metal rim base 20 is provided, of an external diameter substantially equal to the internal diameter of the case 10 and plane in cross-section. The rim base 20 is adapted to be mounted in any suitable manner on a vehicle wheel (not shown) and is formed with a relatively wide integral flange 21 on and extending radially from one side margin. The outer marginal portion of the flange 21 is bent inwardly forming an annular lip 22. The rim base 20 also is formed with a relatively narrow integral flange 23 on and extending radially from its side margin opposite to the flange 21 and an outwardly-opening rabbet 24 is formed in the free margin of said flange 23.

A metal ring 25 is formed with an inwardly-opening rabbet on its inner margin adapted to fit the rabbet 24 and said ring is also formed with semi-circular notches at the base of its rabbet adapted to register with similar semi-circular notches in the margin of the flange 23. Studs 26 (dotted lines Fig. 1) are mounted in the holes formed by the mating notches in the flange 23 and ring 25, the heads of said studs being on the inner surface of said flange and ring, and serve to prevent circumferential movement of the ring relative to the flange. Registering holes 27, 28 are formed in the flange 21 and ring 25, respectively and are countersunk from the outside surface. The outer marginal portion of the ring 25 is bent inwardly to form an annular lip 29. The tire is mounted on the rim, when the ring 25 is removed, by manual force, the base 10 compressing sufficiently to enlarge the opening of its annulus so that it will pass over the relatively narrow flange 23; said base seating on the rim between the flanges. Then the tire is adjusted circumferentially to register the holes 18 with the holes 27 in the flange 21, the studs 26 are placed in the notches in the flange 23 with their heads toward the base 10 and held by contact therewith, the ring 25 is placed against the side of the base with its notches embracing the studs and its holes 28 registering with the holes 27 and 18. Bolts 30, having tapering heads 31, are passed through the holes 28, 18 and 27 in turn and tapering nuts 32 are mounted on the threaded ends of said bolts and tightened thereon. The tapering heads 31 seat in the holes 28 and the tapering nuts 32 seat in the holes 27. The flanges 21 and 25 are clamped together on opposite sides of the tire by the bolts 30 and the annular lips 22 and 29 engage and compress the tire at the juncture of the base 10 and tread portion 11, entering the grooves 12 in such locations or forming such grooves by said compression. The bolts 30 are clipped at their threaded ends flush with the outer faces of the tapering nuts. The heads 31 and nuts 32 preferably are provided with spaced holes 33 opening outwardly and adapted to be engaged by a spanner of common form (not shown) whereby the bolts can be retained against rotation while the nuts are rotated relative thereto. The flange 25 may be seated and the base compressed to permit such seating by the application thereto and use of a vise or clamps of common form to the extent of permitting the application of the nuts to the bolts or their removal therefrom. While the bolts 30 constitute a desirable adjunct to the other devices shown in the matter of retaining the tire against rotation in the rim, yet such use is secondary; dependence principally being made on the gripping of the tire laterally under the clamping function of said bolts. The contact of the annular lips with the tire and the compression of said tire by the flanges is sufficient only to retain the tire in desirable location on and in the rim; but is not so great as to permit cutting of the tire by the lips nor to prevent compression of the base between the flanges as described in connection with the apertures and cavities in said base.

I claim as my invention—

1. A resilient tire composed of an annular homogeneous body, said body being formed with two series only of apertures extending from its lateral sides to its median line, each of said apertures being of substantially isosceles triangular form in cross-section, the apertures on one side being staggered relative to and overlapping the apertures on the other side and alternate apertures in each series being inverted relative to the remaining apertures of said series whereby two rows of holes falling on concentric circles are formed across said median line.

2. A resilient tire composed of an annular homogeneous body having a base and a tread portion, said base being formed with two series only of apertures extending from its lateral sides to its median line, each of said apertures being of substantially isosceles triangular form in cross-section, the apertures on one side being staggered relative to and overlapping the apertures on the other side and alternate apertures in each series differing in size and being inverted relative to the remaining apertures of said series whereby two rows of holes falling on concentric circles are formed across said median line, all of said apertures falling wholly within an annular space defined by circles between and concentric with the radially outer and inner circumferences of the tire.

3. A resilient tire composed of an annular homogeneous body being formed with two series only of apertures extending from its lateral sides to the median line, each of said apertures being of substantially isosceles triangular form in cross-section, the apertures on one side being staggered relative to and overlapping the apertures on the other side and alternate apertures in each series differing in size and being inverted relative to the remaining apertures of said series whereby two rows of holes falling on concentric circles are formed across said median line, all of said apertures falling wholly within an annular space defined by circles between and concentric with the radially outer and inner circumference of the tire.

4. A resilient tire comprising a base portion adapted to be attached to a rim, and a tread portion, said tire being formed with two series only of apertures extending from its lateral sides substantially to but not crossing its median line, each of said apertures being of substantially isosceles triangular form in cross-section, the apertures on one side being staggered relative to and overlapping the apertures on the other side, and alternate apertures on each side being arranged in inverted position relative to the others, whereby mathematically uniform displacement of material and consequent resilience is obtained.

5. A resilient tire comprising a base portion adapted to be attached to a rim, and a tread portion, said tire being formed with two series only of apertures extending from its lateral sides substantially to but not crossing its median line, each of said apertures being of substantially isosceles triangular form in cross-section, the apertures on one side being staggered relative to and overlapping the apertures on the other side and alternate apertures on each side differing in size and being inverted relative to the others, whereby mathematically uniform displacement of material and consequent uniform resilience is obtained.

Signed at Des Moines, in the county of Polk and State of Iowa, this 26th day of January, 1922.

CHARLES D. McCOLLOUGH.